United States Patent
Nastasi et al.

(10) Patent No.: US 11,318,783 B2
(45) Date of Patent: May 3, 2022

(54) SEALING DEVICE FOR A WHEEL HUB UNIT

(71) Applicant: Aktiebolaget SKF, Gothenburg (SE)

(72) Inventors: Antonia Nastasi, Turin (IT); Daniele Duch, San Gillio (IT)

(*) Notice: Subject to any disclaimer, the term of this patent is extended or adjusted under 35 U.S.C. 154(b) by 162 days.

(21) Appl. No.: 16/558,807

(22) Filed: Sep. 3, 2019

(65) Prior Publication Data

US 2020/0079149 A1    Mar. 12, 2020

(30) Foreign Application Priority Data

Sep. 7, 2018   (IT) .................. 102018000008420

(51) Int. Cl.
*B60B 27/00*   (2006.01)
*F16J 15/08*   (2006.01)

(52) U.S. Cl.
CPC ....... *B60B 27/0073* (2013.01); *F16J 15/0818* (2013.01); *B60B 2900/211* (2013.01); *B60B 2900/5112* (2013.01); *B60B 2900/5114* (2013.01)

(58) Field of Classification Search
CPC .............. F16J 15/0818; F16J 15/0887; B60B 27/0073; B60B 2900/211; B60B 2900/5112; B60B 2900/5114
See application file for complete search history.

(56) References Cited

U.S. PATENT DOCUMENTS

| 9,328,770 | B2 | 5/2016 | Ishida | |
|---|---|---|---|---|
| 2011/0206312 | A1 | 8/2011 | Schumacher | |
| 2013/0044972 | A1* | 2/2013 | Ohtsuki | F16J 15/3264 384/448 |
| 2014/0029883 | A1* | 1/2014 | Sanaka | B60B 27/0073 384/486 |
| 2017/0087934 | A1 | 3/2017 | Duch et al. | |

FOREIGN PATENT DOCUMENTS

| IT | 102015000056435 | 3/2017 |
|---|---|---|
| JP | 2012036960 | 2/2012 |

OTHER PUBLICATIONS

International Search Report for Italy Patent Application No. 201800008420 dated Apr. 3, 2019.

* cited by examiner

*Primary Examiner* — Gilbert Y Lee
(74) *Attorney, Agent, or Firm* — Reed Smith LLP

(57) ABSTRACT

A sealing device for a wheel hub unit configured to form a static seal to protect the wheel hub unit from environmental contaminants. The sealing device including a metal shield that is coupled to a collar of the wheel hub unit, and has an end wall, a cylindrical lateral wall integral with, and orthogonal to, the end wall. The lateral wall has twice the thickness of the end wall in order to impart stiffness to the metal shield, and a stop edge integral with the cylindrical lateral wall on the opposite side to the end wall, for bearing axially against the collar; a sealing gasket formed by a silicone-based sealing compound being provided to allow the formation of a bead against a cylindrical lateral wall in an assembly configuration of the sealing device.

5 Claims, 1 Drawing Sheet

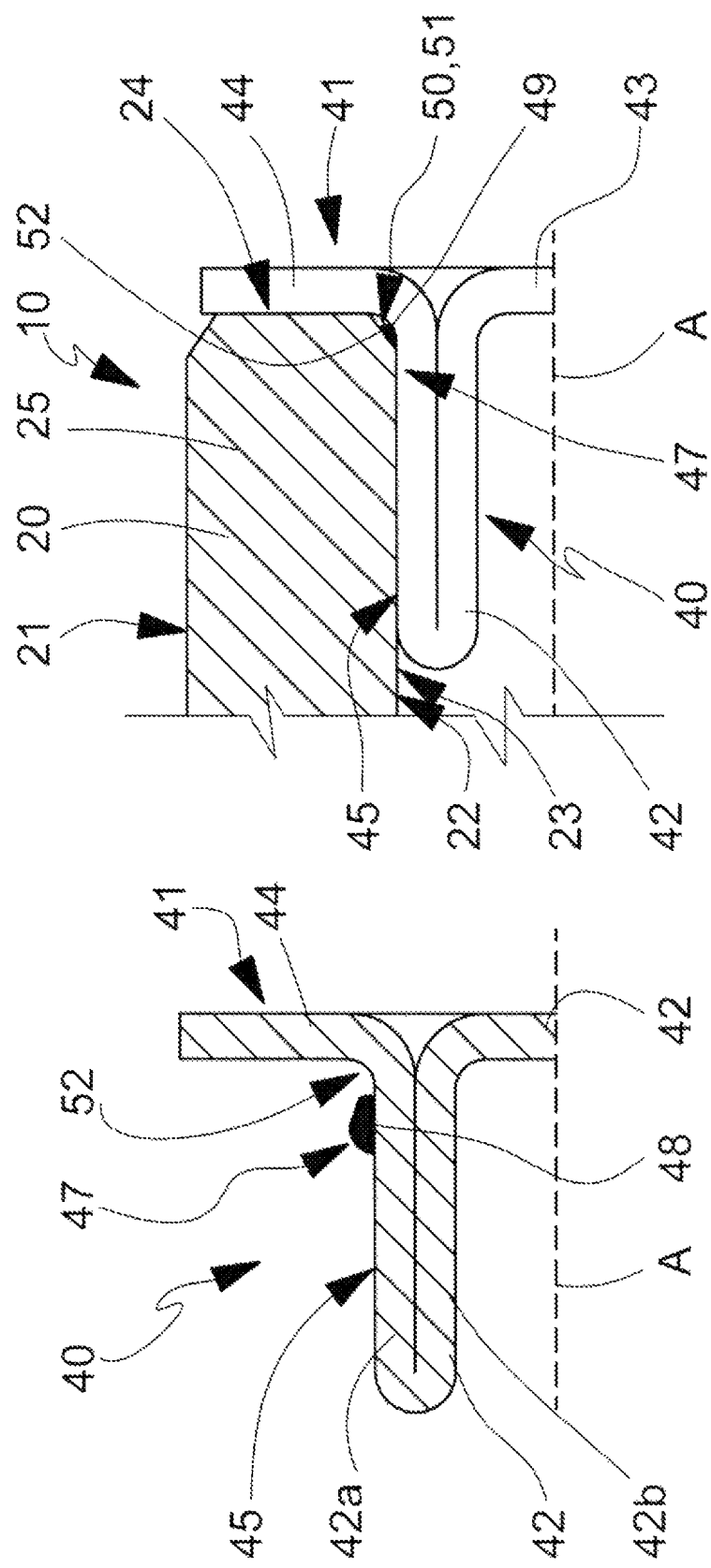

SEALING DEVICE FOR A WHEEL HUB UNIT

CROSS-REFERENCE TO RELATED APPLICATIONS

This application claims priority to Italian patent application no. 102018000008420 filed on Sep. 7, 2018, the contents of which are fully incorporated herein by reference.

FIELD OF THE INVENTION

The present invention relates to a sealing device for a wheel hub unit. The present invention is suitable for the field of wheel hub units for non-driving wheels of vehicles, that is to say wheel hub units not having a half-axle passing along an axis of rotation of the unit, where the corresponding sealing devices have an axisymmetric "cup" shape such that they seal a space located between an outer ring and an inner ring of the unit.

BACKGROUND OF THE INVENTION

Sealing devices of the known type are made so as to be stably connected to the outer ring and, since the outer ring of the wheel hub unit is a non-rotating ring, these sealing devices provide a static seal that protects the unit from any environmental contaminant (water, mud, debris, etc.).

Italian patent application no. 102015000056435, filed on behalf of the present applicant, discloses a sealing device having a virtually cup-shaped sheet metal shield, and comprising:

a cylindrical lateral mounting wall force-fitted into a collar of the outer ring of the wheel hub unit with radial interference and formed by two layers of sheet metal that are completely bent back on to one another, a circular end wall extending in a substantially radial direction, integral with the cylindrical lateral mounting wall, and positioned radially inside the cylindrical lateral mounting wall; and an annular stop edge extending in an annular way, integral with the cylindrical lateral mounting wall, and positioned radially inside the cylindrical lateral mounting wall so that, in use, it bears axially against the collar of the outer ring.

The sealing device of the type described above further comprises a sealing fluid, which is formed by a liquid adhesive, a varnish or another liquid or semi-liquid sealing substance, and which can be applied to the cylindrical lateral mounting wall of the shield to improve the metal-to-metal seal between the annular edge and the collar, thus preventing infiltration of water and contaminants, and thereby reducing the risk of oxidation and rusting on all the inner surfaces of the wheel hub unit.

Although the solution according to 102015000056435 is satisfactory in improving the metal-to-metal seal between the cylindrical lateral mounting wall and the collar, it completely fails to prevent the infiltration of liquids and contaminants between the cylindrical lateral mounting wall and the collar of the outer ring, while having further drawbacks, essentially due to the liquidity of the sealing fluid which, during the transport and handling of the shield, tends to flow along the cylindrical lateral mounting wall and against the annular stop edge, resulting in dispersion of the sealing fluid and problems in the handling of the shield itself.

BRIEF SUMMARY OF THE INVENTION

The object of the present invention is to provide a sealing device for a wheel hub unit that is free of the drawbacks described above.

According to the present invention, a sealing device for a wheel hub unit, having the characteristics stated in the attached claims, is provided.

BRIEF DESCRIPTION OF THE SEVERAL VIEWS OF THE DRAWING

The invention will now be described with reference to the attached drawings, which show two non-limiting examples of embodiment, in which:

FIG. 1 is an axisymmetric section through a preferred embodiment of a sealing device for a wheel hub unit according to the present invention, the device being shown in a pre-assembly configuration; and FIG. 2 is an axisymmetric section through the sealing device of the figure in an assembled configuration with a wheel hub unit.

DETAILED DESCRIPTION OF THE INVENTION

With reference to FIGS. 1 and 2, the number 10 indicates the whole of a wheel hub unit, which is substantially known and is therefore shown only partially for the sake of simplicity, and which comprises a non-rotating outer ring 20 having an axis of symmetry A.

The outer ring 20 is radially delimited by an outer cylindrical surface 21 and by an inner cylindrical surface 22, these surfaces being coaxial with one another and with the axis A, and is axially delimited by an annular surface 24, transverse to the axis A and to both of the surfaces 21 and 22. The inner cylindrical surface 22 delimits an inner space 23 of the unit 10, while the surface 24 is an axially inner front surface of the outer ring 20 and forms, together with the surfaces 21 and 22, a collar 25 of the outer ring 20.

In order to seal the space 23, the unit 10 is provided with a sealing device 40 which is stably connected to the outer ring 20, and, since the outer ring 20 is a non-rotating ring, the sealing device 40 provides a static seal that protects the unit 10 from any environmental contaminant (water, mud, debris, etc.).

The sealing device 40, according to the present invention, comprises a shield 41, preferably made of sheet metal, which is fitted into the outer ring 20 so as to bear axially against the front surface 24 of the outer ring 20, and which comprises, in turn:

a cylindrical lateral mounting wall 42, force-fitted into the collar 25 of the outer ring 20 with radial interference and formed by two layers 42a and 42b of sheet metal that are completely bent back on to one another, a circular end wall 43 extending in a substantially radial direction, integral with the cylindrical lateral mounting wall 42, and positioned radially inside the cylindrical lateral mounting wall 42; and a stop edge 44 extending in an annular way, integral with the cylindrical lateral mounting wall 42, and positioned radially outside the cylindrical lateral mounting wall 42 so that, in use, it bears axially against the collar 25 of the outer ring 20, or, more precisely, against the surface 24.

In the illustrated example of embodiment, the end wall 43 is formed by a single layer of sheet metal, and therefore has a thickness equal to half of the thickness of the cylindrical lateral mounting wall 42, making it possible to strengthen and stiffen the shield 41, and is radially delimited outwardly by a cylindrical fitting surface 45 engaged directly with the surface 22 in the collar 25 of the outer ring 20.

The sealing device 40 further comprises a sealing gasket 47, which is shown in FIG. 1 in its configuration for transport and/or handling, is placed against the fitting surface 45 of the shield 41, and is formed by a silicone-based sealing compound and formulated to set once it has been placed in a continuous bead 48 against the surface 45. In FIG. 2, the sealing gasket 47 is shown in its assembly configuration, in which the silicone-based sealing compound is spread and distributed to create a substantially formless mass 49 between the collar 25 and the shield 41, or, more particularly, is spread and distributed between the surfaces 22 and 45, and may penetrate no farther than into a free space 50 defined by a chamfer 51, formed between the surfaces 22 and 24, and by the shield 41. This is because, during the assembly of the sealing device 40 with the wheel hub unit 10, the wall 42 is moved along the axis A and is force-fitted into the collar 25, causing the surface 45 to slide relative to the surface 22 until the annular edge 44 comes to bear axially against the surface 24. During this sliding, the chamfer 51 of the collar 25 intercepts the bead 48 and deforms it, spreading and distributing it between the two surfaces 22 and 45 until it is brought into the configuration of the mass 49, with a possible accumulation of excess material in the space 50.

By using a sealing gasket 47 formed by a silicone-based sealing compound, it is possible to deposit the bead 48 on the shield 41 at the production site of the shield 41 itself, the shield then being sent to the production site of the wheel hub unit 10, thus avoiding the typical problems that arise when liquid sealing adhesives are used. The sealing gasket 47 formed by a silicone-based sealing compound also enables the surfaces 22 and 45 to be sealed in a fluid-tight way, preventing any infiltration of water and contaminants and reducing the risk of oxidation and rusting on all the inner surfaces of the unit 10.

According to an alternative embodiment of the sealing device 40 described above, this embodiment not being illustrated here but being easily deducible from the description herein, if there are special requirements for handling the shield 41 the sealing gasket 47 is again formed by a silicone-based sealing compound to allow the formation, in a transport and/or assembly configuration of the sealing device 40, of a bead 48 which is placed, in this particular alternative configuration, simultaneously against the cylindrical lateral wall 42 and against the stop edge 44, and the formation, in an assembled configuration of the sealing device 40 with the wheel hub unit 10, of a mass compressed and distributed between the cylindrical lateral wall 42, the stop edge 44 and the collar 25. In other words, in this alternative embodiment, the bead 48 is applied along a substantially right-angled corner 52 defined by the cylindrical lateral wall 42 and the stop edge 44, and, on completion of the assembly, the mass will be compressed inside the corner 52 and, for practical purposes, inside the chamfer 51; that is to say, it will fully, or preferably but not necessarily practically fully, occupy the space 50 defined by the chamfer 51 and by the shield 41 at the position of the corner 52.

According to a further alternative embodiment of the sealing device 40 described above, this embodiment not being illustrated here but also being easily deducible from the description herein, the sealing gasket 47, again if there are special requirements for handling the shield 41, is again formed by a silicone-based sealing compound to allow the formation, in a transport and/or assembly configuration of the sealing device 40, of a bead 48 which, in this particular alternative configuration, is against the stop edge 44, and the formation, in an assembled configuration of the sealing device 40 with the wheel hub unit 10, of a compressed mass distributed between the stop edge 44 and the collar 25, that is to say between the edge 44 and the surface 24.

It is to be understood that the invention is not limited to the embodiments described and illustrated herein, which are to be considered as examples of embodiment of the sealing device for a wheel hub unit; in fact, the invention can be modified with respect to the forms and arrangements of parts and details of construction and operation.

What is claimed is:

1. A sealing device for a wheel hub unit, the sealing device configured to form a static seal to protect the wheel hub unit from environmental contaminants, and comprising:
   a metal shield coupled to a collar of the wheel hub unit, and having an end wall, a cylindrical lateral wall integral with, and orthogonal to, the end wall, the lateral wall having twice the thickness of the end wall in order to impart stiffness to the metal shield, and a stop edge integral with the cylindrical lateral wall on the opposite side to the end wall, for bearing axially against the collar; and
   a continuously placed bead of silicone-based sealing compound, configured to form a bead against the collar in a transport configuration of the sealing device, and the sealing compound configured to spread and distribute into a partially formless mass within a free space defined by a chamfer formed between at least one surface of the metal shield and at least one surface of the collar in an assembled configuration of the sealing device with the wheel hub unit.

2. The sealing device according to claim 1, wherein the continuously placed bead of silicone-based sealing compound is configured, in the transport configuration, to form the bead against the cylindrical lateral wall of the metal shield, and the continuously placed bead of silicone-based sealing compound is configured, in the assembled configuration, to form the mass spread and distributed between the cylindrical lateral wall and the collar of the wheel hub unit.

3. The sealing device according to claim 2, further comprising a compensation space defined by a chamfer formed in the collar and by the shield.

4. The sealing device according to claim 1, wherein the continuously placed bead of silicone-based sealing compound is configured to form, in the transport configuration of the sealing device, of the bead simultaneously against both the cylindrical lateral wall and the stop edge, and the continuously placed bead of silicone-based sealing compound is configured to form, in the assembled configuration, the mass compressed and spread between the cylindrical lateral wall, the stop edge and the collar.

5. The sealing device according to claim 1, wherein the continuously placed bead of silicone-based sealing compound is configured to form, in the transport configuration, the bead against the stop edge, and the continuously placed bead of silicone-based sealing compound is configured to form, in the assembled configuration, the mass compressed and distributed between the stop edge and the collar.

* * * * *